(12) United States Patent
Kumar et al.

(10) Patent No.: US 10,760,014 B2
(45) Date of Patent: *Sep. 1, 2020

(54) CATALYST AND PROCESS FOR CONVERSION OF VACUUM RESID TO MIDDLE DISTILLATES

(71) Applicant: Indian Oil Corporation Limited, Mumbai (IN)

(72) Inventors: Pravesh Kumar, Faridabad (IN); Pappu Naresh, Faridabad (IN); Vinay Kumar Chaudhary, Faridabad (IN); Darshankumar Manubhai Dave, Faridabad (IN); Kamal Kumar, Faridabad (IN); Murugan Balasundaram, Faridabad (IN); Karumanchi Ramesh, Faridabad (IN); Ganesh Vitthalrao Butley, Faridabad (IN); Om Prakash Nandwani, Faridabad (IN); Madhusudan Sau, Faridabad (IN); Brijesh Kumar, Faridabad (IN); Biswapriya Das, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 24 days.

This patent is subject to a terminal disclaimer.

(21) Appl. No.: 15/239,363

(22) Filed: Aug. 17, 2016

(65) Prior Publication Data

US 2017/0058212 A1 Mar. 2, 2017

(30) Foreign Application Priority Data

Aug. 26, 2015 (IN) .......................... 3263/MUM/2015

(51) Int. Cl.
| | |
|---|---|
| *C10G 67/00* | (2006.01) |
| *B01J 35/12* | (2006.01) |
| *C10G 7/06* | (2006.01) |
| *C10G 47/26* | (2006.01) |
| *C10G 65/12* | (2006.01) |
| *C10G 47/00* | (2006.01) |

(Continued)

(52) U.S. Cl.
CPC .............. *C10G 67/00* (2013.01); *B01J 31/02* (2013.01); *B01J 35/12* (2013.01); *C10G 7/06* (2013.01); *C10G 45/62* (2013.01); *C10G 47/00* (2013.01); *C10G 47/26* (2013.01); *C10G 65/12* (2013.01); *C10G 2300/1037* (2013.01); *C10G 2400/00* (2013.01); *C10G 2400/04* (2013.01)

(58) Field of Classification Search
CPC ........ C10G 65/00; C10G 65/02; C10G 65/12; C10G 71/02; C10G 67/00; C10G 67/02; C10G 45/62; C10G 47/00; C10G 47/26
See application file for complete search history.

(56) References Cited

U.S. PATENT DOCUMENTS

| | | | | |
|---|---|---|---|---|
| 3,592,757 A | * | 7/1971 | Baral ..................... | C10G 65/12 208/111.35 |
| 4,214,977 A | | 7/1980 | Ranganathan et al. | |

(Continued)

*Primary Examiner* — Michelle Stein
(74) *Attorney, Agent, or Firm* — Maschoff Brennan

(57) ABSTRACT

This invention relates to a process for hydro cracking of heavy oils. More particularly, this invention relates to a catalytic process for converting heavy oils, such as vacuum gas oil (VGO) and VGO containing a high proportion of vacuum resid (VR) to middle distillate products.

11 Claims, 1 Drawing Sheet

(51) Int. Cl.
*C10G 45/62* (2006.01)
*B01J 31/02* (2006.01)

(56) References Cited

U.S. PATENT DOCUMENTS

| | | | |
|---|---|---|---|
| 5,374,348 A | 12/1994 | Sears et al. | |
| 5,580,442 A * | 12/1996 | Kwon | C10G 65/12 |
| | | | 208/111.01 |
| 5,755,955 A | 5/1998 | Benham et al. | |
| 7,585,406 B2 | 9/2009 | Khadzhiev et al. | |
| 10,201,810 B2 * | 2/2019 | Kumar | B01J 23/28 |
| 2002/0125172 A1 * | 9/2002 | Que | C10G 47/26 |
| | | | 208/108 |
| 2005/0241993 A1 * | 11/2005 | Lott | B01J 27/047 |
| | | | 208/108 |
| 2007/0158236 A1 | 7/2007 | Zhou et al. | |
| 2009/0127161 A1 | 5/2009 | Haizmann et al. | |
| 2009/0129998 A1 * | 5/2009 | Haizmann | C10G 65/12 |
| | | | 422/600 |
| 2011/0303580 A1 * | 12/2011 | Haizmann | C10G 47/26 |
| | | | 208/40 |

* cited by examiner

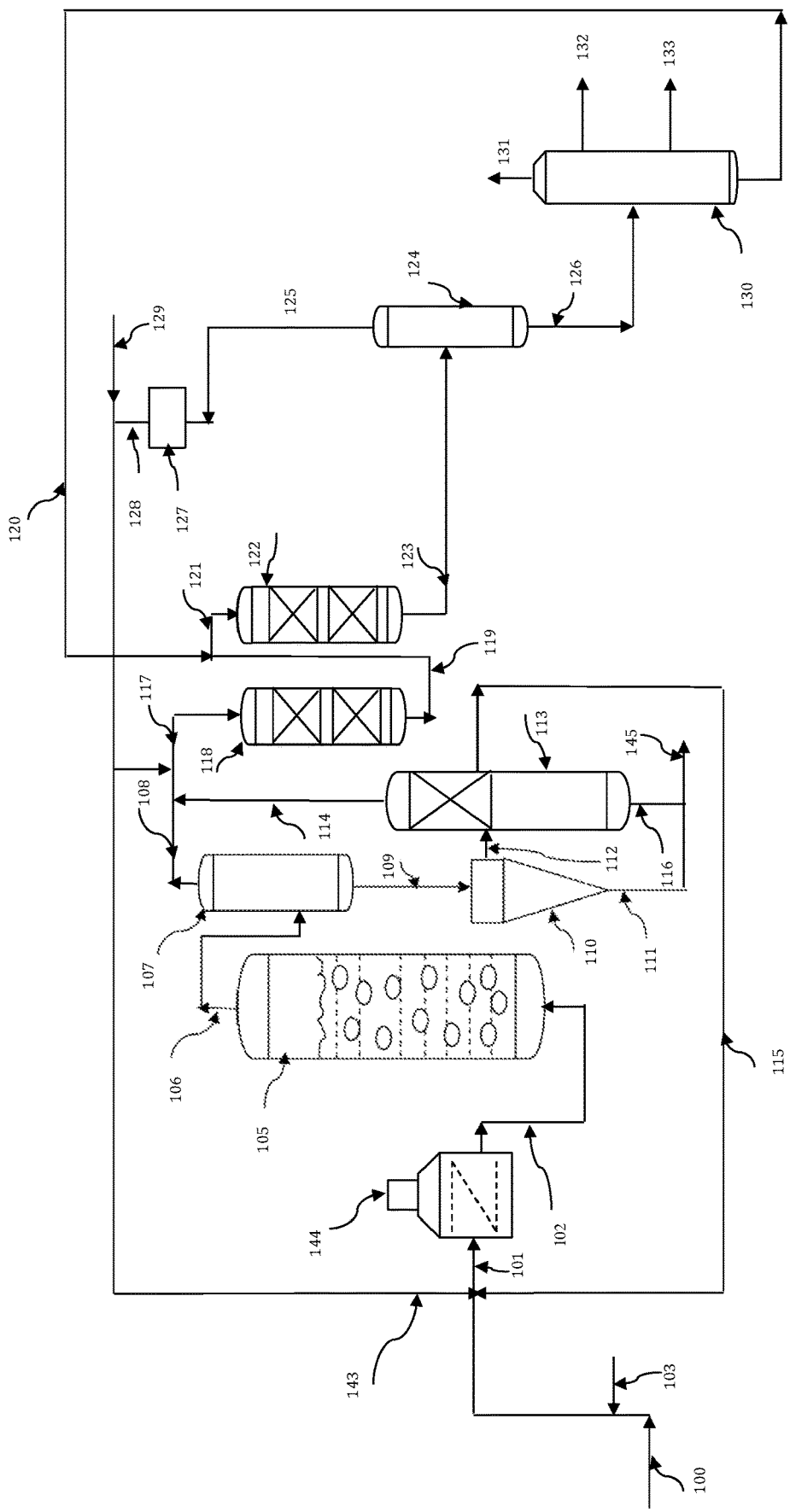

US 10,760,014 B2

CATALYST AND PROCESS FOR CONVERSION OF VACUUM RESID TO MIDDLE DISTILLATES

CROSS-REFERENCE TO RELATED APPLICATIONS

This patent application claims priority pursuant to 35 U.S.C. § 119(b) and 37 CFR 1.55(d) to Indian Patent Application No. 3263/MUM/2015, filed Aug. 26, 2015, which application is incorporated herein in its entirety by reference.

FIELD OF THE INVENTION

This invention relates to a process for hydro cracking of heavy oils. More particularly, this invention relates to a catalytic process for converting heavy oils, such as vacuum gas oil (VGO) and VGO containing a high proportion of vacuum resid (VR) to middle distillate products.

BACKGROUND OF THE INVENTION

In a typical refinery, crude oils are subjected to atmospheric distillation to produce lighter fractions such as gas oils, kerosenes, gasolines, straight run naphtha, etc. Petroleum fractions in the gasoline boiling range, such as naphthas, and those fractions which can readily be thermally or catalytically converted to gasoline boiling range products, such as gas oils, are the most valuable product streams in the refinery. The residue from the atmospheric distillation step is then distilled at a pressure below atmospheric pressure. This later distillation step produces a vacuum gas oil distillate and a vacuum reduced residual oil which typically contains relatively high levels of asphaltene molecules. These asphaltene molecules are responsible for most of the Conradson Carbon Residue (CCR) and metal components in the resid. They also contain relatively high levels of heteroatoms, such as sulfur and nitrogen. These feeds have little commercial value, primarily because they cannot be used as a fuel oil owing to ever stricter environmental regulations. These feeds also have little value as feed-stocks for refinery processes, such as fluid catalytic cracking, because they produce excessive amounts of gas and coke. Also, their high metals content leads to catalyst deactivation. Thus, there is a great need in petroleum refining for greater utilization of such feed-stocks for example by upgrading them to make them more valuable cleaner and lighter feeds.

U.S. Pat. No. 4,214,977 discloses the slurry type process for conversion of heavy hydrocarbon oil using iron-coal catalyst of −100 mesh, in presence of hydrogen. The catalyst reduces the coke precursors and maximum conversion (525° C.) of 70% was obtained depending on reaction severity.

U.S. Pat. No. 5,374,348 discloses a slurry hydro cracking process in which the feed is converted to light hydrocarbon in presence of hydrogen and catalyst (iron-coal) having particle size 45 μm. The heavier fraction having boiling range (450+° C.) including catalyst (iron-coal) is recycled to the reactor thereby reducing the requirement of fresh catalyst addition by about 40%.

U.S. Pat. No. 5,755,955 discloses the improvement in hydroprocessing of heavy oil, obtained by recycling heavy fraction consisting of coke-inhibiting additive and maintaining high ratio of lower polarity aromatics to asphaltenes by adding aromatic oils to feedstock, which may be decant oil from a fluid catalytic cracker or heavy gas oil from hydrocracker or from waste material such as polystyrene waste.

U.S. Pat. No. 7,585,406 discloses a process and catalyst to produce lighter hydrocarbons from high boiling point residue with 95% conversion and no coke formation in the presence of catalyst and hydrogen. The catalyst, then extracted from the solid residue (boiling points >520° C.) after combustion of the same and the catalyst is subjected to reuse.

US20070158236 discloses bimetallic catalyst precursors are manufactured from a plurality of molybdenum atoms and a plurality of atoms of a secondary transition metal (e.g., one or more of cobalt, iron, or nickel). The molybdenum atoms and the secondary transition metal atoms are each bonded with a plurality of organic anions (e.g., 2-ethyl hexanoate) to form a mixture of an oil-soluble molybdenum salt and an oil-soluble secondary transition metal salt. The molybdenum and/or the secondary transition metals are preferably reacted with the organic agent in the presence of a strong reducing agent such as hydrogen. To obtain this mixture of metal salts, an organic agent is reacted with the molybdenum at a temperature between about 100° C. and about 350° C. The secondary transition metal is reacted with the organic agent at a different temperature, preferably between 50° C. and 200° C. The metal salts are capable of forming a hydroprocessing metal sulfide catalyst in heavy oil feedstocks.

US20090127161 discloses a process and apparatus is disclosed for converting heavy hydrocarbon feed into lighter hydrocarbon products. The heavy hydrocarbon feed is slurried with a particulate solid material to form a heavy hydrocarbon slurry and hydrocracked to produce vacuum gas oil (VGO). A light portion of the VGO may be hydrotreated and subjected to fluid catalytic cracking to produce fuels such as gasoline. A heavy portion of the VGO may be recycled to the slurry hydrocracking reactor. FCC slurry oil may be recycled to the slurry for hydrocracking.

SUMMARY OF THE INVENTION

Accordingly, the main embodiment of the present invention provides a process for converting heavy oils in to lighter hydrocarbons said process comprising the steps of:
  (a) heating a mixture [101] comprising of heavy oil feed [100], Heavy Vacuum Gas Oil (HVGO) recycle feed stream [115], hydrogen [143] and an oil soluble liquid catalyst [103] in a heater [144];
  (b) transferring and charging the mixture of step (a) in a tubular slurry hydrocracking (SHC) reactor [105] at temperature in the range of 250° C. to 550° C., pressure in the range of 40 to 250 bar and a liquid hourly space velocity is below 4 h$^{-1}$;
  (c) obtaining and transferring gas-liquid mixture of step (b) to a hot high pressure separator [107];
  (d) separating the gas-liquid mixture of step (c) into (i) first gaseous stream of hydrocarbons which is free of oil soluble liquid catalyst having boiling point up to 500° C. [108] and (ii) second liquid stream of hydrocarbons containing oil soluble liquid catalyst having boiling point above 500° C. [109] which contains HVGO and Unconverted oil (UCO);
  (e) extracting the second liquid stream of hydrocarbons of step (d) and transferring to a hydrocyclone separator [110] and separating it into (i) a first part consisting of liquid portion consisting of HVGO and Unconverted oil [112] having a boiling temperature in the range of 500-525° C. which consist of oil soluble liquid catalyst particles of size less than 20 micron with high concentration of aromatic compounds; and (ii) second portion consisting of pitch [111] having a boiling point of above 525° C. which is consisting particles of oil soluble liquid catalyst of size more than 20 micron which is purged out [145];

(f) transferring the first portion consisting of HVGO and Unconverted oil of step (e) to vacuum distillation column [113] to obtain (i) VGO [114], HVGO [115] which is recycled to heating mixture [101] and subsequently to slurry hydrocracking reactor [105], and pitch [116] which is purged out [145];

(g) transferring first gaseous stream of hydrocarbons [108] of step (d) to first hydrotreating reactor [118] comprising hydrotreating catalyst in the temperature range of 200° C. to 600° C. and in pressure in the range of 20 bar to 90 bar, optionally along with additional hydrogen [108];

(h) extracting the stream of step (g) through line [119], mixing it with VGO [120] and transferring it to hydrocracking reactor [122];

(i) transferring the effluent of step (h) to High Pressure Separator (HPS) [124];

(j) obtaining gaseous stream rich in hydrogen and a liquid hydrocarbon product from step (i), wherein gaseous stream rich in hydrogen is drawn off through the overhead line [125] and wherein a liquid hydrocarbon product is drawn off the bottom through [126];

(k) transferring the liquid hydrocarbon product of step (i) to a product fractionator [130]; and (l) obtaining premium quality streams of $C_4$ [131], naptha [132], diesel [133] and VGO [120], wherein VGO [120] is recycled to fixed bed hydrocracking reactor [122] after mixing with hydrotreating reactor [118] effluent line [119].

Another embodiment of the present invention relates to a process for converting heavy oils in to lighter hydrocarbons as herein described wherein step (a) the recycled HVGO feed stream [115] makes up in the range of 1-5% wt % of the feedstock to SHC reactor.

Another embodiment of the present invention provides a process for converting heavy oils in to lighter hydrocarbons as herein described wherein pitch [115] makes up in the range of 2-15% wt % of the feedstock to SHC reactor.

Another embodiment of the present invention provides a process for converting heavy oils in to lighter hydrocarbons as herein described wherein SHC reactor [105] comprises liquid hydrocarbon feed, sulphided liquid catalyst and gaseous hydrocarbon and vaporized hydrocarbon.

Another embodiment of the present invention provides a process for converting heavy oils in to lighter hydrocarbons as herein described wherein gaseous stream [108] comprises between about 35 and 90 wt % of hydrocarbon products.

Another embodiment of the present invention provides a process for converting heavy oils in to lighter hydrocarbons as herein described wherein hydrotreating catalyst consist of at least one Group VIII metal and at least one Group VI metal on a high surface area support material, such as refractory oxide.

Another embodiment of the present invention provides a process for converting heavy oils in to lighter hydrocarbons as herein described wherein the gaseous part [125] constituting majority of hydrogen gas (>90%) recycled through a recycle gas compressor [127] and line [128] back to reactor [105].

Another embodiment of the present invention provides a process for converting heavy oils in to lighter hydrocarbons as herein described wherein step (b) the preferred reaction conditions of SHC reactor [105] consist of temperature in the range 440° C. to 475° C., pressure in the range of 100 to 190 bar and a liquid hourly space velocity in the range of 0.3 $h^{-1}$ up to 1 $h^{-1}$.

Another embodiment of the present invention provides a process for converting heavy oils in to lighter hydrocarbons as herein described wherein step (f) the vacuum distillation column [113] is having a temperature in the range of 250° C. to 500° C. and pressure in the range of 1.7 to 10 kPa.

Another embodiment of the present invention provides a process for converting heavy oils in to lighter hydrocarbons as herein described wherein the oil soluble liquid catalyst comprises Ni (1-5 wt %) and Mo (95-99 wt %) organometallic compound in suitable solvent such as toluene.

Another embodiment of the present invention provides a process for converting heavy oils in to lighter hydrocarbons as herein described wherein the oil soluble liquid catalyst ranges from about 0.05-4% by weight based on fresh feedstock.

Another embodiment of the present invention provides a process for converting heavy oils in to lighter hydrocarbons as herein described wherein the oil soluble liquid catalyst is sulfided and the hydrocracking of heavy oil is performed in a slurry reactor.

Another embodiment of the present invention provides a process for converting heavy oils in to lighter hydrocarbons as herein described wherein during sulfiding reaction the catalyst gets converted into crystallites of nanometre size and gets dispersed in the reaction mixture, the portion of this dispersed nano-sized catalyst particles grows in size greater than 1 micron during the course of slurry hydrocracking reaction.

Another embodiment of the present invention provides a process for converting heavy oils in to lighter hydrocarbons as herein described wherein HVGO consist of aromatics compounds in concentration more than 70 wt %, more preferably more than 80 wt %.

Another embodiment of the present invention provides a process for converting heavy oils in to lighter hydrocarbons as herein described wherein the removal of pitch in step (e) is performed to avoid choking of the downstream section of the reactors.

Another embodiment of the present invention provides a process for converting heavy oils in to lighter hydrocarbons as herein described wherein step (h) the gaseous is hydrotreated with catalyst at a temperature in the range of 250° C. to 650° C. and pressure in the range of 30 bar to 210 bar.

Another embodiment of the present invention provides a process as herein described wherein the mesophase yield fraction of slurry reactor effluent less than 0.5 wt %.

Another embodiment of the present invention provides a process as herein described wherein the heavy oil feedstock is asphaltene rich product from a deasphalting process.

DESCRIPTION OF THE FIGURES

FIG. 1. Portrays the scheme for Slurry-bed Resid hydrocracking according to the present invention.

DESCRIPTION OF THE INVENTION

While the invention is susceptible to various modifications and/or alternative processes and/or compositions, specific embodiment thereof has been shown by way of example in the drawings and tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Definitions

The term "Oil Soluble Liquid Catalyst" as used in the context of the present invention means the catalyst is in liquid form and is soluble in hydrocarbon oils. The catalyst comprises Ni (1-5 wt %) and Mo (95-99 wt %) organometallic compound prepared by reacting molybdenum trioxide with an amine in an aqueous medium in which a water-soluble ammonium salt of an inorganic or organic acid is dissolved. Preferred amines are polymeric, aliphatic, alicyclic, aromatic and heterocyclic amines in suitable solvent such as toluene.

The term "Heavy oils" as used in the context of the present invention means hydrocarbon oils having majority of the fraction boiling above 525° C.

The term "Heavy Vacuum Gas Oil" as used in the context of the present invention means the hydrocarbon oils having boiling range between 500 to 525° C.

The term "Premium Quality Products" as used in the context of the present invention means the product meeting the specification of Euro-VI/Bharat Stage—VI i.e. diesel having maximum Sulphur content 10 ppm and Cetane Number higher than 52, while gasoline having minimum research octane number of 95.

The term "mesophase yield fraction" as used in the context of the present invention means the crystallinity of the products indicating the initiation of formation of coke.

The present invention relates to a process of converting heavy oils into premium quality lighter hydrocarbon products using an oil soluble liquid catalyst. The present invention further also relates to a process for hydro cracking of heavy oils in the presence of oil soluble liquid catalyst that is economically valuable and environmentally friendly, which can be used as transportation fuels is disclosed.

In one aspect the present invention provides heavy oil feed and oil soluble liquid catalyst comprises Ni (1-5 wt %) and Mo (95-99 wt %) organometallic compound in suitable solvent such as toluene is charged to slurry reactor along with hydrogen where the oil soluble liquid catalyst is first get sulfided and heavy oil get hydrocracked to lighter products.

During sulfiding reaction, the catalyst gets converted into crystallites of nanometer size and gets dispersed in the reaction mixture, the portion of this dispersed nano-sized catalyst particles grows in size larger than 1 micron during the course of slurry hydrocracking reaction.

The effluent from slurry reactor is then separated in two portions:

first portion comprising hydrocarbons boiling up to 500° C. and essentially free of solid catalyst particles and second portion boiling above 500° C. containing solid oil soluble liquid catalyst particles of all sizes.

The second portion is further separated in two parts in another separator: first boiling between 500 to 525° C. termed as Heavy Vacuum Gas Oil (HVGO) and the second portion boiling above 525° C. termed as pitch. The HVGO containing solid oil soluble liquid catalyst particles of sizes less than 20 microns and having very high concentrations of aromatic compounds is recycled to slurry reactor along with fresh heavy oil feed and oil soluble liquid catalyst.

The second portions from second separator i.e. pitch containing oil soluble liquid catalyst particles greater than 20 micron size is removed to avoid choking of the downstream section of the reactors. The reactor effluent up to Vacuum Gas Oil (VGO) fractions boiling below 500° C. from first separator are hydrotreated first and then hydrocracked under conventional hydroprocessing conditions using conventional hydrotreating and hydrocracking catalysts. The effluent from this hydrocracking reactor is fractionated and premium quality lighter liquid products boiling up to 370° C. is recovered and the unconverted Vacuum Gas Oil (VGO) is recycled back to hydrocracking reactor of conventional hydroprocessing step.

In the present invention, a catalyst and process is disclosed for hydrocracking of heavy oils in the presence of catalyst. A process comprising first step of converting an oil soluble liquid catalyst into active state by sulphiding and subsequent conversion of heavy oil to lighter liquid products in Slurry bed hydrocracking reactor is disclosed.

The process further comprises recycling of part of liquid products (HVGO) along with fresh heavy oil for improving the product selectivity. This recycled HVGO constitutes solid catalyst particles of sizes less than 20 microns and is having very high concentrations of aromatics compounds. The separation of particles generated during the reaction at reactor exit also avoids the chance of choking of downstream sections.

More specifically an important aspect of the present invention provides a catalyst and process for converting heavy oils into premium quality lighter hydrocarbon products which can be used as transportation fuels are disclosed.

The process constitutes four steps: the first hydrocracking in slurry phase step, the second separation step consisting of multitude of separators, the third step having conventional hydrotreating and hydrocracking reactors in series and the fourth step having fractionator for fractionating products from effluent of third step.

In first step, the heavy oil feed, the recycled HVGO from separation section and oil soluble liquid catalyst is charged to reactor along with hydrogen gas where the oil soluble liquid catalyst is first get sulfided and heavy oil get hydrocracked to lighter products. During sulfiding reaction, the catalyst gets converted into crystallites of nanometer size and gets dispersed in the reaction mixture, the portion of this dispersed nano-sized catalyst particles grows in size larger than 1 micron during the course of slurry hydrocracking reaction. The oil soluble liquid catalyst is effective even at lower concentration of 100 ppm allowing higher conversion of heavy hydrocarbons feed (525° C.+) with sufficiently low production of coke. Use of Ni and Mo organometallic compound allows superior conversion of heavy hydrocarbon feed to desirable products in the reactor.

The second step is separation section, in which, the effluent from reactor is separated in two portions: first portion comprising hydrogen gas and hydrocarbons boiling up to 500° C. and essentially free of oil soluble liquid catalyst particles of any size and second portion boiling above 500° C. containing oil soluble liquid catalyst particles of all sizes. The second portion is further separated in two fractions in another separator: first boiling between 500 to 525° C. termed as Heavy Vacuum Gas Oil (HVGO) and the second portion boiling above 525° C. termed as pitch. The HVGO containing oil soluble liquid catalyst particles of sizes less than 20 microns and having very high concentrations of aromatic compounds is recycled to slurry reactor along with fresh heavy oil feed and oil soluble liquid catalyst. The second fractions from second separator i.e. pitch containing solid catalyst particles greater than 20 micron size is removed to avoid choking of the downstream section of the reactors.

In the third step, the reactor effluent up to Vacuum Gas Oil (VGO) fractions boiling below 500° C. and hydrogen gas from first separator and essentially free of oil soluble liquid catalyst particles of all sizes is sent to hydrotreating first and then hydrocracked under conventional hydroprocessing conditions using conventional hydrotreating and hydrocracking catalysts.

In the fourth i.e. last step, the effluent from hydrocracking reactor is fractionated and premium quality lighter liquid products boiling up to 370° C. is recovered and the unconverted Vacuum Gas Oil (VGO) is recycled back to hydrocracking reactor of conventional hydroprocessing step.

Thus the scheme for slurry-bed resid hydrocracking as carried out in the present invention is described as below which is schematically shown in the FIG. 1. The process depicted in FIG. 1 embodies heavy oil feed line [100] and the HVGO recycle feed stream [115] having highly aromatic nature mixed with the oil soluble liquid catalyst [103] and hydrogen stream [143] is combined in line [101]. The combined feed [101] is heated in the heater [144]. The heated stream [102] is pumped in the bottom of tubular slurry hydrocracking reactor [SHC reactor, 105] and is distributed through an appropriate distributor. Typically the recycled HVGO feed stream [115] makes up in the range of 1-5% wt % of the feedstock to SHC reactor. While the pitch stream [145] makes up in the range of 2-15% of feedstock, depending upon the quality of feedstock and conversion level. The feed entering the SHC reactor comprises liquid hydrocarbon feed, sulphided liquid catalyst and gaseous hydrocarbon and vaporized hydrocarbon.

The process can be operated at moderated pressure, in the range of 40 to 220 bar and preferably in the range of 100 to 190 bar without coke formation in SHC reactor [105]. The reactor temperature is typically in the range of 400° C. to 510° C. with a temperature of about 430° C. to 480° C. being suitable and a range of 440° C. to 475° C. being preferred. The Liquid Hourly Space Velocity (LHSV) is typically below about 4 h$^{-1}$ on a fresh feed basis with a range of about 0.1 to 2.5 h$^{-1}$ being preferred and a range of about 0.3 to 1 h$^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor [105] is above the inlet. Although only one reactor is shown in FIG. 1, one or more SHC reactors [105] may be utilized in parallel or in series.

A gas-liquid mixture is withdrawn from the top of SHC reactor [105] through line [106] and separated preferably in a hot high pressure separator [107] kept at a separation temperature of between 250 to 470° C. and preferably at about the pressure of SHC reactor. In the hot separator [107], the effluent from the SHC reactor [105] is separated into a gaseous stream [108] and a liquid stream [109]. The liquid stream [109] contains Heavy VGO and Unconverted oil. The gaseous stream [108] comprises between about 35 and 90 wt % of hydrocarbon products from the SHC reactor [105] and is further processed to recover hydrocarbons and hydrogen for recycle.

The liquid portion [109] of the product consisting solids, from hot separator [107] is separated into liquid and solid fraction in hydrocyclone [110] by removing solid particles of size greater than 20 micron generated during the reaction. In hydrocyclone, the solid particles [111] are removed as pitch and purged out of the system while liquid portion [112] may be used as recycle stream to the SHC reactor [105] after separation which may occur in liquid vacuum fractionation column [113]. Line [112] introduces the liquid fraction from the hydrocyclone [110] preferably to a vacuum distillation column [113] maintained at a pressure between about 1.7 and 10.0 kPa and at a vacuum distillation temperature resulting in an atmospheric equivalent cut point between VGO and Heavy VGO of between about 250° C. and 500° C. Three fractions may be separated in the liquid fractionation column: an overhead fraction of VGO in an overhead line [114] which may be further processed, a Heavy VGO stream from a side cut in line [115] and a pitch stream obtained in a bottoms line [116] which typically boils above 525° C. During the SHC reaction, it is important to minimize coking. Adding lower polarity aromatic oil to the feedstock reduces coke production. The polar aromatic material may come from a variety of sources. The heavy VGO [115] which is typically 5-15% wt % of the fresh feed may be recycled to provide required polarity.

The gaseous stream in line [108] typically contains lower concentrations of aromatic components than the liquid fraction in line [109] and requires further refining. The gaseous stream in line 108 may be passed to a catalytic hydrotreating reactor [118] having beds charged with hydrotreating catalyst. If necessary, additional hydrogen may be added in line [108]. Suitable hydrotreating catalysts for use in the present invention are any known conventional hydrotreating catalysts and include those which are comprised of at least one Group VIII metal and at least one Group VI metal on a high surface area support material, such as refractory oxide. The gaseous stream is contacted with the hydrotreating catalyst at a temperature between about 200° C. and 600° C. in the presence of hydrogen at a pressure between about 20 bar to 90 bar. The hydrotreated product from the hydrotreating reactor [118] may be withdrawn through line [119].

The effluent from hydrotreating reactor [118] in line [119] is mixed with VGO [120] and the combined mixture [121] is passed through a catalytic cracking reactor [122] having beds charged with hydrocracking catalyst. If necessary, additional hydrogen may be added in line [121]. Suitable hydrocracking catalyst for use in present invention are any known conventional hydrocracking catalyst and include those which are comprised of at least one Group VIA and one Group VIIIA metal at high surface area support material. The gaseous stream is contacted with the hydrocracking catalyst at a temperature between 250 to 650° C. in the presence of hydrogen at a pressure between 30 to 210 bar. The effluent from hydrocracking reactor [122] in line [123] may be delivered to a High Pressure Separator (HPS) [124]. Within the HPS, the product is separated into a gaseous stream rich in hydrogen which is drawn off through the overhead line [125] and a liquid hydrocarbon product which is drawn off the bottom through [126]. The gaseous part [125] constituting majority of hydrogen gas (>90%) recycled through a recycle gas compressor [127] and line

[128] back to reactor [105]. The make-up hydrogen is provided through line [129]. The liquid part [126] of HPS further goes to a product fractionator [130].

The product fractionator [130] may comprise one or several vessels although it is shown only as one in FIG. 1. The product fractionators produces a $C_4$-recovered in overhead line [131], a naphtha product stream in line [132], a diesel stream in line [133] and a VGO stream in bottoms line [120], which gets recycled to fixed bed hydrocracking reactor [122] after mixing with hydrotreating reactor [118] effluent line [119].

Accordingly, the main embodiment of the present invention provides a process for converting heavy oils in to lighter hydrocarbons said process comprising the steps of:

(a) heating a mixture [101] comprising of heavy oil feed [100], HVGO recycle feed stream [115], hydrogen [143] and an oil soluble liquid catalyst [103] in a heater [144];

(b) transferring and charging the mixture of step (a) in a tubular slurry hydrocracking reactor [105] at temperature in the range of 250° C. to 550° C., pressure in the range of 40 to 250 bar and a liquid hourly space velocity is below 4 $h^{-1}$;

(c) obtaining and transferring gas-liquid mixture of step (b) to a hot high pressure separator [107];

(d) separating the gas-liquid mixture of step (c) into (i) first gaseous stream of hydrocarbons which is free of oil soluble liquid catalyst having boiling point up to 500° C. [108] and (ii) second liquid stream of hydrocarbons containing oil soluble liquid catalyst having boiling point above 500° C. [109] which contains Heavy Vacuum Gas Oil (HVGO) and Unconverted oil (UCO);

(e) extracting the second liquid stream of hydrocarbons of step (d) and transferring to a hydrocyclone separator [110] and separating it into (i) a first part consisting of liquid portion consisting of HVGO and Unconverted oil [112] having a boiling temperature in the range of 500-525° C. which consist of oil soluble liquid catalyst particles of size less than 20 micron with high concentration of aromatic compounds; and (ii) second portion consisting of pitch [111] having a boiling point of above 525° C. which is consisting particles of oil soluble liquid catalyst of size more than 20 micron which is purged out [145];

(f) transferring the first portion consisting the HVGO and Unconverted oil of step (e) to vacuum distillation column [113] to obtain (i) VGO [114], HVGO [115] which is recycled to heating mixture [101] and subsequently to slurry hydrocracking reactor [105], and pitch [116] which is purged out [145];

(g) transferring first gaseous stream of hydrocarbons [108] of step (d) to first hydrotreating reactor [118] comprising hydrotreating catalyst in the temperature range of 200° C. to 600° C. and in pressure in the range of 20 bar to 90 bar, optionally along with additional hydrogen [108];

(h) extracting the stream of step (g) through line [119], mixing it with VGO [120] and transferring it to hydrocracking reactor [122];

(i) transferring the effluent of step (h) to High Pressure Separator (HPS) [124];

(j) obtaining gaseous stream rich in hydrogen and a liquid hydrocarbon product from step (i), wherein gaseous stream rich in hydrogen is drawn off through the overhead line [125] and wherein a liquid hydrocarbon product is drawn off the bottom through [126];

(k) transferring the liquid hydrocarbon product of step (i) to a product fractionator [130]; and (l) obtaining premium quality streams of $C_4$ [131], naptha [132], diesel [133] and VGO [120], wherein VGO [120] is recycled to fixed bed hydrocracking reactor [122] after mixing with hydrotreating reactor [118] effluent line [119].

Another embodiment of the present invention relates to a process for converting heavy oils in to lighter hydrocarbons as herein described wherein step (a) the recycled HVGO feed stream [115] makes up in the range of 1-5% wt % of the feedstock to SHC reactor.

Another embodiment of the present invention provides a process for converting heavy oils in to lighter hydrocarbons as herein described wherein pitch [115] makes up in the range of 2-15% wt % of the feedstock to SHC reactor.

Another embodiment of the present invention provides a process for converting heavy oils in to lighter hydrocarbons as herein described wherein SHC reactor [105] comprises liquid hydrocarbon feed, sulphided liquid catalyst and gaseous hydrocarbon and vaporized hydrocarbon.

Another embodiment of the present invention provides a process for converting heavy oils in to lighter hydrocarbons as herein described wherein gaseous stream [108] comprises between about 35 and 90 wt % of hydrocarbon products.

Another embodiment of the present invention provides a process for converting heavy oils in to lighter hydrocarbons as herein described wherein hydrotreating catalyst consist of at least one Group VIII metal and at least one Group VI metal on a high surface area support material, such as refractory oxide.

Another embodiment of the present invention provides a process for converting heavy oils in to lighter hydrocarbons as herein described wherein the gaseous part [125] constituting majority of hydrogen gas (>90%) recycled through a recycle gas compressor [127] and line [128] back to reactor [105].

Another embodiment of the present invention provides a process for converting heavy oils in to lighter hydrocarbons as herein described wherein step (b) the preferred reaction conditions of SHC reactor [105] consist of temperature in the range 440° C. to 475° C., pressure in the range of 100 to 190 bar and a liquid hourly space velocity in the range of 0.3 $h^{-1}$ up to 1 $h^{-1}$.

Another embodiment of the present invention provides a process for converting heavy oils in to lighter hydrocarbons as herein described wherein step (f) the vacuum distillation column [113] is having a temperature in the range of 250° C. to 500° C. and pressure in the range of 1.7 to 10 kPa.

Another embodiment of the present invention provides a process for converting heavy oils in to lighter hydrocarbons as herein described wherein the oil soluble liquid catalyst comprises Ni (1-5 wt %) and Mo (95-99 wt %) organometallic compound in suitable solvent such as toluene.

Another embodiment of the present invention provides a process for converting heavy oils in to lighter hydrocarbons as herein described wherein the oil soluble liquid catalyst ranges from about 0.05-4% by weight based on fresh feedstock.

Another embodiment of the present invention provides a process for converting heavy oils in to lighter hydrocarbons as herein described wherein the oil soluble liquid catalyst is sulfided and the hydrocracking of heavy oil is performed in a slurry reactor.

Another embodiment of the present invention provides a process for converting heavy oils in to lighter hydrocarbons as herein described wherein during sulfiding reaction the catalyst gets converted into crystallites of nanometre size and gets dispersed in the reaction mixture, the portion of this dispersed nano-sized catalyst particles grows in size greater than 1 micron during the course of slurry hydrocracking reaction.

Another embodiment of the present invention provides a process for converting heavy oils in to lighter hydrocarbons as herein described wherein HVGO consist of aromatics compounds in concentration more than 70 wt %, more preferably more than 80 wt %.

Another embodiment of the present invention provides a process for converting heavy oils in to lighter hydrocarbons as herein described wherein the removal of pitch in step (e) is performed to avoid choking of the downstream section of the reactors.

Another embodiment of the present invention provides a process for converting heavy oils in to lighter hydrocarbons as herein described wherein step (h) the gaseous is hydrotreated with catalyst at a temperature in the range of 250° C. to 650° C. and pressure in the range of 30 bar to 210 bar.

Another embodiment of the present invention provides a process as herein described wherein the mesophase yield fraction of slurry reactor effluent less than 0.5 wt %.

Another embodiment of the present invention provides a process as herein described wherein the heavy oil feedstock is asphaltene rich product from a deasphalting process.

Another embodiment of the present invention provides a process as herein described wherein the pitches consist of oil soluble liquid catalyst particles in the concentration above 1000 ppm wt formed and this also constitutes 2 to 15 wt % on fresh feed basis, more preferably it is in the range of 1 to 5 wt % on fresh feed basis.

Another embodiment of the present invention provides a process as herein described wherein the removal of pitch is performed to avoid choking of the downstream section of the reactors.

Another embodiment of the present invention provides a process as herein described wherein in HVGO consist of oil soluble liquid catalyst particles in the concentration above 10 ppm wt.

The invention will now be explained with the help of following examples. However, the scope of the invention should not be limited to these examples as the person skilled in the art can easily vary the proportion of the ingredients and combinations.

EXAMPLES

Example 1

A feed suitable for Slurry Hydrocracking (SHC) is characterized in Table-1. This feed was used in all the examples:

TABLE 1

| Characteristics of Feed stock: | |
|---|---|
| | Feed (VR) |
| Properties | |
| Specific gravity, g/cc | 1.020 |
| ICAP Metals (ppm) | |
| Mo | 2.8 |
| Ni | 49 |
| V | 174 |
| Fe | 8.5 |
| CCR | 24.79 |
| S, wt % | 5.4 |
| Total N, ppm | 1400 |
| Heptane insolubles, wt % | 8.55 |

Example 2

An oil soluble liquid catalyst containing comprising Ni (1-5 wt %) and Mo (95-99 wt %) organometallic compound Ni and Mo salt was evaluated. The catalyst was pretreated by adding 2 wt % sulfiding agent relative to the feed and catalyst and heating the mixture to 230° C. at 30 bar over hydrogen for an hour to activate the catalyst before heating the mixture to reaction temperature. In a typical experiment, 300 grams of vacuum resid of Example 1 was charged in a 1 liter autoclave with the liquid catalyst between 165 to 660 ppm on metal basis. In the example cited in Table 2, the autoclave was heated for 120 minutes at 180 bar at operation temperature. Hydrogen was continuously added through a sparger and passed through the reactor continuously at a rate of 350 Standard Litres Per Hour (SLPH) and removed through a back pressure regulator to maintain pressure. The hydrogen stripped out the light products which were condensed in a high pressure separator. In Table 2, all of the yield numbers are calculated as a ratio to the feed.

TABLE 2

Product yield with different catalyst concentration (165, 330, 660 ppm) on fresh feed basis at different operating temperature and pressure of 180 bar.

| | | Feed | Base Case | Experiment-1 | Experiment-2 | Experiment-3 |
|---|---|---|---|---|---|---|
| Cat. Conc (Metal basis) | ppm | | 0 | 330 | 660 | 165 |
| Reactor WABT | ° C. | | 450 | 470 | 450 | 450 |
| Pressure | bar | | 180 | 180 | 180 | 180 |
| Yield (Fresh Feed Basis) | | | | | | |
| $H_2S$ + $NH_3$ | wt % | | 2.02 | 5.43 | 5.25 | 4.48 |
| Off Gas ($C_1$&$C_2$) | wt % | | 4.76 | 8.76 | 5.16 | 8.44 |
| LPG | wt % | | 2.84 | 4.23 | 3.62 | 2.95 |
| Naptha (C5-132° C.) | wt % | | 5.71 | 18.15 | 6.91 | 11.91 |
| LGO (132° C.-380° C.) | wt % | | 24.51 | 51.72 | 55.29 | 51.59 |
| HGO (380° C.-500° C.) | wt % | 11.6% | 14.83 | 7.55 | 12.00 | 10.62 |
| HVGO (500° C.-525° C.) | wt % | 2.4% | 3.09 | 1.57 | 2.50 | 2.21 |
| Pitch (525° C.+) | wt % | 86% | 44.82 | 5.97 | 10.97 | 12.44 |

Example 3

Recycling of Recovered <20 Micron Catalyst to Reduce Fresh Catalyst Requirement In the process of example 2, the liquid stream HVGO is dissolved in toluene and filtered with whatman grade 41 filter to retain solids >20 micron followed by grade 42 filter to retain particles smaller than 20 microns. This recovered catalyst particles of <20 micron size were added to the autoclave and the amount of fresh catalyst required was reduced by nearly 16.3% to achieve similar conversion levels.

TABLE 3

Yield pattern comparison for example 2 and example 3

| Product | | Experiment-3 | Experiment-4 |
|---|---|---|---|
| Cat. Conc (Metal basis) | ppm | 165 | Make-up Fresh catalyst (138 ppm) + recovered <20 μm catalysts |
| Reactor WABT | ° C. | 450 | 450 |
| Pressure | bar | 180 | 180 |
| Yield (Fresh Feed Basis) | | | |
| $H_2S + NH_3$ | wt % | 4.48 | 4.57 |
| Off Gas ($C_1$&$C_2$) | wt % | 8.44 | 8.53 |
| LPG | wt % | 2.95 | 3.01 |
| Naptha (C5-132° C.) | wt % | 11.91 | 11.61 |
| LGO (132° C.-380° C.) | wt % | 51.59 | 51.22 |
| HGO (380° C.-500° C.) | wt % | 10.62 | 10.69 |
| HVGO (500° C.-525° C.) | wt % | 2.21 | 2.23 |
| Pitch (>525° C.) | wt % | 12.44 | 12.71 |

Example 4

Recycling of Recovered <20 Micron Catalyst Along with >20 Micron Catalysts

In the process of example 2, the streams HVGO & Pitch are dissolved in toluene and filtered with whatman filter grade 42 to retain particles of all sizes.

All of the recovered catalyst from HVGO & Pitch was added to the reactor along with make-up fresh catalyst. In this case addition of same amount of make-up catalyst as in example 3 has resulted in reduction of conversion level by 6.2%. To achieve the similar conversion level, make up of fresh catalyst had to be increased by 10.5%. Here the negative effect of presence of >20 micron catalyst particles acting as seed for growth of catalyst particles could be observed. This means that in a continuous process there will be ever increasing negative impact of recycling >20 micron catalysts.

TABLE 4

Yield pattern comparison for example 4

| Product | | Experiment-5 | Experiment-6 |
|---|---|---|---|
| Cat. Conc (Metal basis) | ppm | Make-up Fresh catalyst (138 ppm) + recovered <20 μm catalysts + recovered >20 μm catalysts | Make-up Fresh catalyst (+10.5% additional) (153 ppm) + recovered <20 μm catalysts + |
| Reactor WABT | ° C. | 450 | 450 |
| Pressure | bar | 180 | 180 |
| Yield (Fresh Feed Basis) | | | |
| $H_2S + NH_3$ | wt % | 3.95 | 4.75 |
| Off Gas ($C_1$&$C_2$) | wt % | 6.49 | 8.54 |
| LPG | wt % | 2.73 | 3.04 |
| Naptha (C5-132° C.) | wt % | 9.38 | 11.57 |
| LGO (132° C.-380° C.) | wt % | 47.62 | 51.14 |
| HGO (380° C.-500° C.) | wt % | 12.86 | 10.65 |
| HVGO (500° C.-525° C.) | wt % | 2.68 | 2.22 |
| Pitch (>525° C.) | wt % | 18.2 | 12.67 |

Example 5

In the process of example 2, HVGO along with <20 micron catalyst was recycled to the reactor and fresh feed & catalyst proportionately reduced. The results show improvement in conversion and increased lighter product generation.

TABLE 5

Recycling of HVGO along with <20 micron catalyst

| Product | | Experiment 3 | Experiment-7 |
|---|---|---|---|
| Cat. Conc (Metal basis) | ppm | 165 | Make-up Fresh catalyst (138 ppm) & HVGO along with recovered <20 μm catalysts |
| Reactor WABT | ° C. | 450 | 450 |
| Pressure | bar | 180 | 180 |
| Yield (Fresh Feed Basis) | | | |
| $H_2S + NH_3$ | wt % | 4.48 | 3.95 |
| Off Gas ($C_1$&$C_2$) | wt % | 8.44 | 8.76 |
| LPG | wt % | 2.95 | 3.06 |
| Naptha (C5-132° C.) | wt % | 11.91 | 12.37 |
| LGO (132° C.-380° C.) | wt % | 51.59 | 53.57 |
| HGO (380° C.-500° C.) | wt % | 10.62 | 10.45 |
| HVGO (500° C.-525° C.) | wt % | 2.21 | 1.96 |
| Pitch (525° C.+) | wt % | 12.44 | 9.92 |

We claim:

1. A process for converting heavy oils into lighter hydrocarbons said process consisting of the steps:
   (a) heating a mixture in a heater, wherein the mixture comprises a fresh feedstock and a HVGO recycle feed stream, and wherein the fresh feedstock comprises a heavy oil feed, hydrogen and an oil soluble liquid catalyst;
   (b) transferring and charging the mixture of step (a) in a tubular slurry hydrocracking (SHC) reactor, wherein the oil soluble liquid catalyst is sulphided at 230° C. and hydrocracking of heavy oil occurs at a temperature in the range of 250° C. to 550° C., a pressure in the range of 40 to 250 bar and a liquid hourly space velocity is below 4 $h^{-1}$;
   (c) obtaining and transferring a gas-liquid mixture obtained from step (b) to a hot high pressure separator;
   (d) separating the gas-liquid mixture of step (c) into (i) a first gaseous stream of hydrocarbons which is free of an oil soluble liquid catalyst having a boiling point up to 500° C., and (ii) a second liquid stream of hydrocarbons containing the oil soluble liquid catalyst having a boiling point above 500° C. which contains Heavy Vacuum Gas Oil (HVGO) and Unconverted oil (UCO);

(e) extracting the second liquid stream of hydrocarbons of step (d) and transferring to a hydrocyclone separator and separating it into (i) a first part consisting of a liquid portion consisting of HVGO and Unconverted oil, HVGO having a boiling temperature in the range of 500-525° C. which consist of oil soluble liquid catalyst particles of size less than 20 micron with a high concentration of aromatic compounds; and (ii) a second portion consisting of pitch having a boiling point of above 525° C. which consists of particles of oil soluble liquid catalyst having a size more than 20 microns which is purged out;

(f) transferring the first portion consisting of the HVGO and Unconverted oil of step (e) to a vacuum distillation column to obtain VGO, HVGO which is recycled to the heating mixture and subsequently to the slurry hydrocracking reactor, and pitch which is purged out;

(g) transferring the first gaseous stream of hydrocarbons of step (d) to a first hydrotreating reactor comprising a hydrotreating catalyst in the temperature range of 200° C. to 600° C. and pressure in the range of 20 bar to 90 bar, optionally along with additional hydrogen;

(h) extracting the stream from the hydrotreating reactor of step (g) through line, mixing it with an unconverted VGO and transferring it to a hydrocracking reactor;

(i) transferring an effluent of step (h) to a High Pressure Separator (HPS);

(j) obtaining a gaseous stream rich in hydrogen and a liquid hydrocarbon product from step (i), wherein the gaseous stream rich in hydrogen is drawn off through an overhead line and wherein the liquid hydrocarbon product is drawn off the bottom through;

(k) transferring the liquid hydrocarbon product of step (i) to a product fractionator; and (l) obtaining premium quality streams of $C_4$, naphtha, diesel and the unconverted VGO, wherein the unconverted VGO is recycled to the fixed bed hydrocracking reactor after mixing with the hydrotreating reactor effluent line;

wherein the premium quality streams have 85.71 to 94.12 wt % components having a boiling point up to 525° C.

wherein the HVGO consists of aromatics compounds in concentration more than 70 wt %; and wherein the pitch is in the range of 5.97 to 12.44 wt % of the fresh feedstock;

wherein during the sulfiding reaction the catalyst gets converted into crystallites of nanometer size and gets dispersed in the reaction mixture, wherein a portion of this dispersed nano-sized catalyst particles grows in size greater than 1 micron during the course of the slurry hydrocracking reaction; and wherein a requirement of make-up catalyst is reduced by 16.3% to achieve similar conversion levels by using oil soluble liquid catalyst particles of size less than 20 micron while purging out oil soluble liquid catalyst particles having a size more than 20 microns.

2. The process for converting heavy oils into lighter hydrocarbons as claimed in claim 1, wherein in step (a) the recycled HVGO feed stream makes up in the range of 1-5 wt % of the mixture.

3. The process for converting heavy oils into lighter hydrocarbons as claimed in claim 1, wherein the gaseous stream comprises between about 35 and 90 wt % of hydrocarbon products.

4. The process for converting heavy oils into lighter hydrocarbons as claimed in claim 1, wherein in step (b) the reaction conditions of the SHC reactor comprise a temperature in the range of 440° C. to 475° C., a pressure in the range of 100 to 190 bar, and a liquid hourly space velocity in the range of 0.3 h$^{-1}$ up to 1 h$^{-1}$.

5. The process for converting heavy oils into lighter hydrocarbons as claimed in claim 1, wherein in step (f) the vacuum distillation column has a temperature in the range of 250° C. to 500° C., and a pressure in the range of 1.7 to 10 kPa.

6. The process for converting heavy oils into lighter hydrocarbons as claimed in claim 1, wherein the hydrotreating catalyst comprises at least one Group VIII metal and at least one Group VI metal on a high surface area support material.

7. The process for converting heavy oils into lighter hydrocarbons as claimed in claim 1, wherein the gaseous stream constituting a majority of hydrogen gas in the range of >90% is recycled through a recycle gas compressor and line back to the reactor.

8. The process for converting heavy oils into lighter hydrocarbons as claimed in claim 1, wherein the oil soluble liquid catalyst comprises organometallic compounds Ni in the range of 1-5 wt % and Mo in the range of 95-99 wt % in a suitable solvent.

9. The process for converting heavy oils into lighter hydrocarbons as claimed in claim 1, wherein the oil soluble liquid catalyst ranges from about 0.05-4% by weight based on the total weight of the fresh feedstock.

10. The process for converting heavy oils into lighter hydrocarbons as claimed in claim 1, wherein the purging out of the pitch in step (e) is carried out to avoid choking of the downstream section of the reactors.

11. The process for converting heavy oils into lighter hydrocarbons as claimed in claim 1, wherein in step (h) the stream is contacted with a hydrocracking catalyst at a temperature in the range of 250° C. to 650° C., and pressure in the range of 30 bar to 210 bar.

* * * * *